US012043056B2

(12) United States Patent
Hospel

(10) Patent No.: US 12,043,056 B2
(45) Date of Patent: Jul. 23, 2024

(54) METHOD FOR MANUFACTURING A CARD

(71) Applicant: IAI industrial systems B.V., Veldhoven (NL)

(72) Inventor: Wilhelmus Gerardus Johannes Maria Hospel, Bladel (NL)

(73) Assignee: IAI industrial systems B.V., Veldhoven (NL)

( * ) Notice: Subject to any disclaimer, the term of this patent is extended or adjusted under 35 U.S.C. 154(b) by 0 days.

(21) Appl. No.: 17/301,141

(22) Filed: Mar. 26, 2021

(65) Prior Publication Data

US 2021/0268829 A1 Sep. 2, 2021

Related U.S. Application Data

(63) Continuation of application No. 16/922,193, filed on Jul. 7, 2020, now Pat. No. 11,007,810.

(30) Foreign Application Priority Data

Jul. 8, 2019 (EP) .................................... 19184959

(51) Int. Cl.
*B42D 25/435* (2014.01)
*B42D 25/351* (2014.01)

(52) U.S. Cl.
CPC ......... *B42D 25/435* (2014.10); *B42D 25/351* (2014.10)

(58) Field of Classification Search
CPC ............................ B42D 25/435; B42D 25/351
USPC ............ 283/67, 70, 72, 74, 94, 98, 901, 904
See application file for complete search history.

(56) References Cited

U.S. PATENT DOCUMENTS

2008/0284157 A1* 11/2008 Muke .................. B42D 25/435 283/86
2013/0181434 A1* 7/2013 Prique .................. G09F 3/0294 264/1.7
2013/0193679 A1* 8/2013 Fuhse .................. B42D 25/41 283/85
2014/0151996 A1* 6/2014 Camus .................. B42D 15/00 283/67
2018/0326777 A1* 11/2018 Reddy .................. B42D 25/387
2018/0361777 A1 12/2018 Fuhse et al.
2020/0307299 A1* 10/2020 Van Dijk .............. B42D 25/41
(Continued)

FOREIGN PATENT DOCUMENTS

DE 102012204340 A1 9/2013
EP 2767395 A1 8/2014
(Continued)

OTHER PUBLICATIONS

U.S. Appl. No. 16/922,193, filed Jul. 7, 2020, Method for Manufacturing a Card.
(Continued)

*Primary Examiner* — Justin V Lewis
(74) *Attorney, Agent, or Firm* — Schwegman Lundberg & Woessner, P.A.

(57) ABSTRACT

A method for manufacturing a card comprising a transparent window. The window comprises a front side and a back side. The method comprises steps of printing a color picture on the back side of the window and laser engraving the front side of the window. Also provided is a device configured to carry out the above-described method and a card manufactured with the above-described method.

21 Claims, 2 Drawing Sheets

(56) References Cited

U.S. PATENT DOCUMENTS

2021/0008920 A1 1/2021 Hospel

FOREIGN PATENT DOCUMENTS

| | | | | |
|---|---|---|---|---|
| JP | 4715160 B2 | | 4/2011 | |
| WO | WO-2018164574 A1 | * | 9/2018 | ............. B42D 25/23 |

OTHER PUBLICATIONS

U.S. Appl. No. 16/922,193 U.S. Pat. No. 11,007,810, filed Jul. 7, 2020, Method for Manufacturing a Card.

"U.S. Appl. No. 16/922,193, Non Final Office Action mailed Oct. 6, 2020", 8 pgs.

"U.S. Appl. No. 16/922,193, Notice of Allowance mailed Jan. 14, 2021", 8 pgs.

"U.S. Appl. No. 16/922,193, Response filed Dec. 18, 2020 to Non Final Office Action mailed Oct. 6, 2020", 7 pgs.

"European Application Serial No. 19184959.5, Extended European Search Report mailed Dec. 3, 2019", 6 pgs.

"European Application Serial No. 19184959.5, Communication Pursuant to Article 94(3) EPC mailed Jul. 16, 2021", 3 pgs.

"European Application Serial No. 19184959.5, Response filed Sep. 27, 2021 to Communication Pursuant to Article 94(3) EPC mailed Jul. 16, 2021", 11 pgs.

* cited by examiner

METHOD FOR MANUFACTURING A CARD

CROSS-REFERENCE TO RELATED APPLICATIONS

The present application is a continuation of U.S. patent application Ser. No. 16/922,193, titled "Method for Manufacturing a Card," filed Jul. 7, 2020, which claims priority to European Patent Application No. 19184959.5, titled "Method for Manufacturing a Card," filed Jul. 8, 2019, each of which is hereby incorporated herein by reference in its entirety.

FIELD

The disclosure relates to a method for manufacturing a card. The card may be a data carrier, especially a value document, a security paper, a passport, a bank card, an ID card, a driver license card or similar.

BACKGROUND

Various methods for manufacturing a card are known.

For example, US 2008/0250954 A1 relates to a data carrier having a substrate and, applied on the substrate, a coating into which, through the action of laser radiation, markings are introduced in the form of patterns, letters, numbers or images. The coating includes a laser-radiation-absorbing layer and a printing layer that is disposed over the absorbing layer and that is at least partially transmissive to the laser radiation. The printed substrate is pressed during or after the imprinting of the at least partially transmissive layer.

For example, US 2008/0191462 A1 relates to a value document, such as a bank note, passport or the like, which has a security paper and a marking produced with the help of a laser, the security paper having at least one partial area with a coating, and the marking extending over the border area between the coating and the security paper.

There is a need to provide a time-saving method for producing a card wherein a picture, for example, a color picture, is provided securely within the card. It is an object of the invention to provide such a method and a device configured to carry out the method.

SUMMARY

This object is accomplished by a method and a device according to the present disclosure.

Therefore, a method for manufacturing a card comprising a transparent window is provided. The window comprises a front side and a back side. The method comprises steps of printing a color picture on the back side of the window, and laser engraving the front side of the window. The card may be a value document, such as a security paper, a passport, an ID card, a driver license card, and/or a bank card. By printing a color picture, data is applied to the back side of the card, e.g. at least to the area where the window is provided. A color picture includes at least one color different from black and white. The picture may be a face of a person, and/or a code comprising at least one letter and/or at least one number. The step of laser engraving may be carried out before, after and/or at the same time as, i.e. during, the step of printing the color picture. The card may comprise one or a plurality of layers. In case of a plurality of layers, these layers might be pressed together, preferably by using a mold, before, after and/or between carrying out the steps of printing the color picture on the back side of the window and laser engraving the front side of the window. The back side of the window may form a planar surface with the back side of the card. The front side of the window may form a planar surface with the front side of the card.

Since the laser engraved picture is inside the card, it cannot be removed by abrasion. If a forger removes the color picture, the greyscale image resulting from laser engraving remains and also remains visible when being overprinted with a different photo. Thus, one can see that the two images, the greyscale image resulting from laser engraving and the photo provided by the forger do not match anymore. Furthermore, the laser engraving creates a secure picture inside the card but it is a grey scale image. More specifically, normally laser engraving in, for example, polycarbonate creates black, and thus, a greyscale image can be created containing black and white (e.g. in areas where no laser engraving is applied, and the background is, for example, white). By printing alone, one would obtain a color picture but only on top of the card surface and, therefore, the card would not be that secure. Since the window provided in the card is transparent, a color of non-engraved portions of the window depends on the color printed on the back side of the card and becomes visible on the front side of the card. Therefore, combining laser engraving and printing gives the advantages of both printing and engraving, such that a secure color picture can be provided.

The step of printing a color picture on the back side of the window may be carried out by inkjet printing, for example, by using cyan, magenta and yellow inks. The inkjet printing may be continuous and/or drop on demand inkjet printing. Also, any other combination of colors which form a full color gamut picture together with the laser engraved image can be used. Also, other color printing technologies such as dye sublimation can be used.

The step of laser engraving the front side of the window may comprise providing a lenticular screen on the front side of the window. When a lenticular screen is provided, the step of printing the color picture on the back side of the window may comprise printing a first and a second picture. The first picture may be (slightly) displaced with respect to the second picture. The first picture may be the color picture. The second picture may be the color picture. Both, the first and the second picture, may be color pictures. When the lenticular screen is provided, it is also possible to print only one color picture on the back side of the window and engrave two (different) images on the front side of the window. Thus, two different pictures may be seen when looked at under two different angles. The first and the second picture may be the same picture or different pictures. The lenticular screen may be achieved by using a mold which comprises recesses at least in the area where the window is provided. Before the step of laser engraving the card may be pressed in the mold comprising the recesses such that the lenticular screen on the front side of the window results. The step of printing the color picture on the back side of the card may be carried out before or after the molding. The lenticular screen may comprise a (substantially) convex surface, e.g. a surface with convex portions. The recesses of the mold may correspond to the convex surface. The laser engraving may be carried out under two or more different angles with respect to the front side of the card. The two angles may be preset based on the displacement of the first and the second picture printed on the back side of the card, such that a viewer may see the first picture under a first viewing angle and may see the second picture under a second viewing angle. The two angles may be so narrow to each other that both eyes of a viewer see the two pictures printed on the back side of the card or engraved from the front side of the card at the same time such that a perception of 3D, i.e. a 3D photo, results. The two pictures may, for example, show the same object, e.g. a person, under slightly different angles.

The first and/or second picture may be provided by using inkjet printing, for example, by using cyan, magenta and yellow inks. As outlined above, the inkjet printing may be continuous and/or drop on demand inkjet printing. Also, any other combination of colors which form a full color gamut picture together with the laser engraved image can be used. Also, other color printing technologies such as dye sublimation can be used.

The method may further comprise a step of laminating and/or printing an additional layer over the picture on the back side of the window. The additional layer may be partly transparent. Transparency of this additional layer may depend on an exposure to light of the additional layer. The additional layer may comprise one or more sub layers.

Furthermore, a device is provided configured to carry out the above-described method. Also provided is a card manufactured with the above-described method.

BRIEF DESCRIPTION OF THE DRAWINGS

The drawings illustrate generally, but not by way of limitation, various embodiments discussed in the present disclosure.

DETAILED DESCRIPTION

Figure 1:
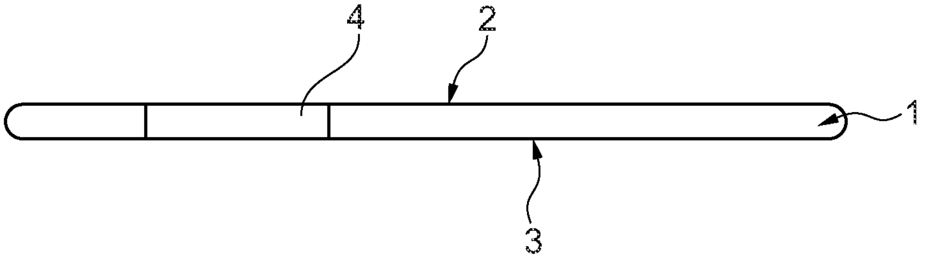
FIG. 1 depicts schematically a cross-sectional view of a card according to one embodiment.

As can be gathered from FIG. 1, the card 1 comprises a front side 2 and a back side 3. A transparent window 4 extending from the front side 2 to the back side 3 is provided in an area of the card 1. Thus, the window 4 extends throughout the whole cross-section of the card 1. The card 1 comprises a laser sensitive material, e.g. a laser sensitive plastic, such as polycarbonate.

Figure 2:
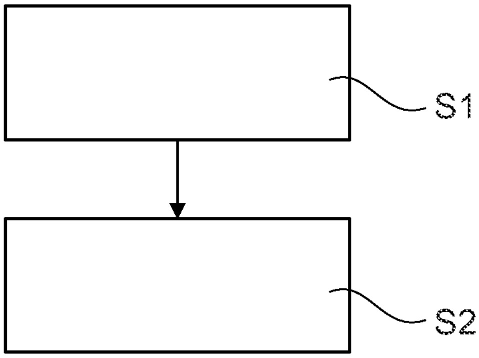
FIG. 2 depicts schematically a flow chart of a method for manufacturing a card according to one embodiment.

As can be gathered from FIG. 2, in a first step S1, at least in the area where the transparent window 4 is provided, a color picture, e.g. with cyan, magenta and yellow, is printed on the back side 3 of the card 1. In a second step S2, at least in the area where the transparent window 4 is provided, the front side 2 of the card 1 is (laser) engraved in black such that a color picture results. The engraving of the front side 2 may be carried out before, after and/or at the same time as printing the picture on the back side 3. That is, a time span during which the first step S1 is carried out and a time span during which the second step S2 is carried out may at least partly overlap.

Figure 3A:
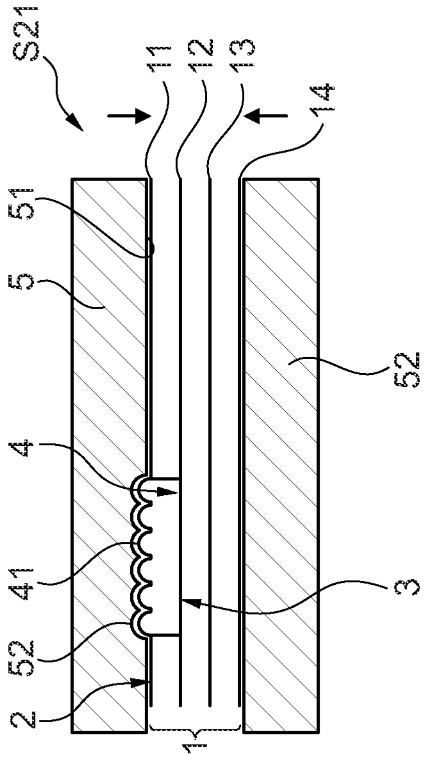
FIG. 3*a* depicts schematically a step of pressing together a card comprising multiple layers by using a mold according to one embodiment.
Figure 3B:
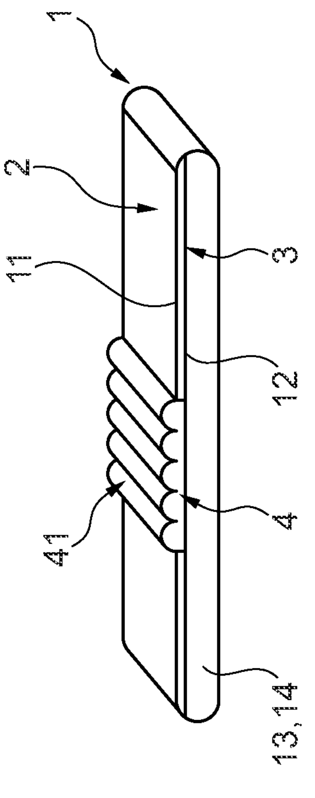
FIG. 3*b* depicts schematically the card with a lenticular screen resulting from the step shown in FIG. 3*a*.
Figure 3C:
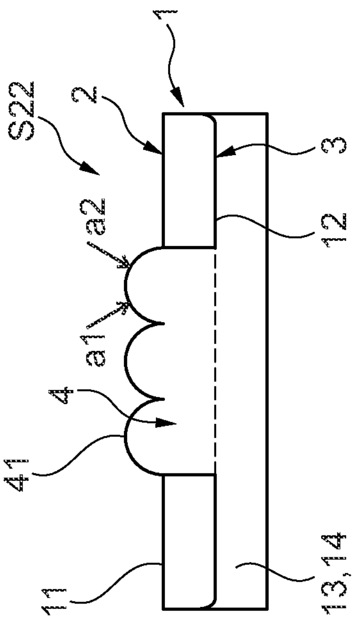
FIG. 3*c* depicts schematically a step of laser engraving a front side of the card shown in FIG. 3*b* under two different angles.
Figure 3D:
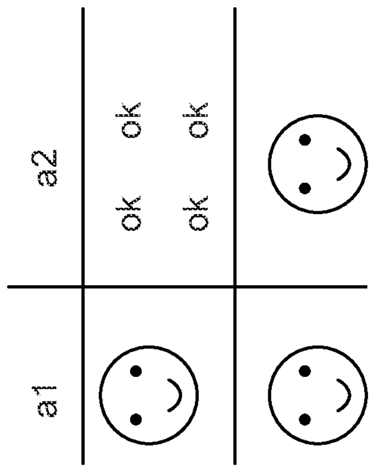
FIG. 3*d* depicts schematically the pictures a viewer can see when viewing under different angles onto the front side of the card after the step shown in FIG. 3*c* is carried out.

Furthermore, as shown throughout FIGS. 3*a*-*d*, a lenticular screen could be added to the window 4. This may be done, for example, during or before the second step S2 of the manufacturing process of the card 1 described above. Furthermore, under at least two different angles a1, a2 (as shown in FIG. 3*c*) data, e.g. two pictures, may be applied by laser engraving at least to the area of the card 1 where the window 4 is provided. However, the present embodiment is not limited to two pictures and also more than two pictures, for example, three or four or more pictures, may be provided. It is possible that only one color picture is printed on the back side 3 of the card 1, but also more than one picture, for example, two or more (color) pictures, may be printed on the back side. The data applied under the first angle a1 and the data applied under the second angle a2 may be the same, but can also be different data.

More specifically, in FIG. 3*a*, a first sub step S21 of the second step S2 is shown. In the first sub step S21, one or, as shown in FIG. 3*a*, multiple layers 11, 12, 13, 14 forming the card 1 are pressed (together) using a mold 5. In a surface 51 of the mold 5 corresponding to the front side 2 of the card 1 in at least the area of the card 1 where the window 4 is provided, recesses 52 are provided.

Here, a surface of the first layer 11 forms the front side 2 of the card 1 and a surface of the second layer 12 forms the back side 3 of the card 1. The window 4 extends from the first layer 11 to the second layer 12. The transparency of the third and/or fourth layer 13, 14 may depend on their exposure to light. However, the present disclosure is not limited to four layers, and it is also possible that the window extends through multiple layers, such as five, six or seven layers, or even all layers forming the card. The layers provided with the window may be internal layers.

When pressing together the multiple, here four, layers 11, 12, 13, 14 in the first sub step S21, a surface 41 of the window 4 on the front side 2 of the card 1 is provided with a lenticular screen, i.e. a structure corresponding to the respective recesses 52 provided in the surface 51 of the mold 5. The card 1 resulting from the first sub step S21 is shown in FIG. 3*b*, wherein the lenticular screen is provided at the surface 41 of the window 4.

In a second sub step S22, following the first sub step S21, at least the area where the window 4 is provided, e.g, the surface 41 of the window 4 on the front side 2 of the card 1, is laser engraved. As can be gathered from FIG. 3*c*, laser engraving may be done under two different angles a1, a2 with respect to the front side 2 of the card 1. As already indicated above, the present disclosure is not limited to the two angles a1 a2, but laser engraving may be carried out also under more than two angles or only one angle.

By printing at least one color picture in the first step S21 on the back side of the window 4 formed by the second layer 12, and laser engraving the surface 41 of the window 4 on the front side 2 of the card 1 formed by the first layer 11 under the two different angles a1, a2, two color pictures may be achieved that may be seen under the two different angles a1, a2.

It is also possible to print two different color pictures slightly offset from each other on the back side 3. A viewer, when viewing at the surface 41 of the window 4 on the front side 2 of the card 1 under the first angle a1, will see a first data, e.g. a face of a person. Under the second angle a2, the viewer will see a second data. As can be appreciated from the first row in FIG. 3*d* the second data may, for example, be a marking like "ok," or as can be appreciated from the second row of FIG. 3*d*, the second data may also be the face of the person. Also, an image of a person and a second image of the same person with superimposed other information, such as the text "ok," may be provided.

In case of a 3D photo, the two angles a1, a2 are generally so narrow that both eyes of the viewer see the two pictures at the same time, i.e. a perception of a 3D-picture is created. It is also possible that the same object/person under at least two slightly different viewing angles (left ear/right ear) is depicted.

As described above, here it is possible to print two images on the back side. But, it is also possible to provide only one color print and laser engrave two images under different angles on the front side.

It is also possible that the above-described method comprises an additional step of laminating and/or printing an additional layer on the back and/or front side 2, 3 of the window 4. This additional layer may be (partly) transparent. The transparency of the additional layer may depend on the exposure to light thereof.

Figure 4:
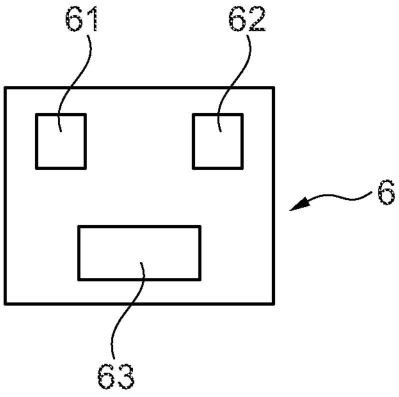
FIG. 4 depicts schematically a device configured to carry out a method for manufacturing a card according to one embodiment.

In FIG. 4, a device 6 for manufacturing the card 1 described above with reference to FIGS. 1 to 3 is schematically shown. The device 6 comprises a printing unit 61 and a laser engraving unit 62.

The printing unit 61 is configured to print the color picture on the back side 3 of the window 4. The printing unit 61 may be configured to print the color picture without using black since black is added by the laser engraving unit by laser engraving the front side 2. The laser engraving unit 62 is configured to laser engrave the front side 2 of the window 4. The laser engraving unit 62 is configured to laser engrave the front side 2 of the window 4 before, after or during the time the printing unit 61 prints the color picture.

More specifically, the printing unit 61 is configured to print the color picture on the back side 3 of the window 4 by inkjet printing, for example, by using cyan, magenta and yellow inks.

The laser engraving unit 62 is configured to laser engrave the front side 2 of the window 4, which may comprise the lenticular screen on the front side 2 of the window 4. To provide the lenticular screen on the front side of the window 4, the device may further comprise the mold 5 described above with reference to FIG. 3*a*.

The printing unit 61 may not only be configured to print the color picture on the back side 3 of the window 4 but further to print an additional picture on the back side 3 of the window 4 displaced from the color picture. The laser engraving unit 62 may then be configured to laser engrave the front side 2 of the window 4 comprising the lenticular screen under two different angles a1, a2 with respect to the displacement of the two pictures printed on the back side 3 of the window 4.

The device may further comprise a laminating unit 63. The laminating unit 63 is configured to laminate and/or print an additional layer over the picture on the back side 3 of the window 4. Transparency of the additional layer may depend on an exposure to light of the additional layer. This additional layer may be (partly) transparent.

REFERENCE SIGNS LIST

1 card
11 first layer
12 second layer
13 third layer
14 fourth layer

2 front side
3 back side
4 window
41 surface
5 mold
51 surface
52 recesses
6 device for manufacturing the card
61 printing unit
62 laser engraving unit
63 laminating unit
S1 step of printing
S2 step of laser engraving
S21 first sub step of providing lenticular screen
S22 second sub step of laser engraving lenticular screen under two different angles
a1 first angle
a2 second angle

The invention claimed is:

1. A method for manufacturing a card having a transparent window with a front side and a back side, the method comprising:

printing a color picture onto the back side of the window; and lasering the front side of the window after printing the color picture;

wherein the color picture and the lasering form a composite secure color picture.

2. The method of claim 1, wherein printing a color picture onto the back side of the window is carried out by at least one of dye sublimation or inkjet printing.

3. The method of claim 2, further comprising providing a lenticular screen on the front side of the window.

4. The method of claim 3, wherein lasering the front side of the window comprises lasering under two different angles.

5. The method of claim 1, wherein lasering the front side of the window comprises lasering under two different angles.

6. The method of claim 1, wherein printing the color picture onto the back side of the window comprises printing an additional picture onto the back side of the window displaced from the color picture.

7. A method for manufacturing a card having a transparent window with a front side and a back side, the method comprising:

printing a color picture onto the back side of the window; and lasering the front side of the window before printing the color picture;

wherein the color picture and the lasering form a composite secure color picture.

8. The method of claim 7, further comprising at least one of laminating or printing an additional layer over the color picture on the back side of the window.

9. A card manufactured with the method according to claim 7, and comprising the window having the color picture printed onto the back side thereof and having the lasered front side.

10. A method for manufacturing a card having a transparent window with a front side and a back side, the method comprising:

printing a color picture onto the back side of the window; and lasering the front side of the window during the step of printing the color picture;

wherein the color picture and the lasering form a composite secure color picture.

11. The method of claim 10, further comprising at least one of laminating or printing an additional layer over the color picture on the back side of the window.

12. A card manufactured with the method according to claim 10, comprising the window having the color picture printed onto the back side thereof and having the lasered front side.

13. The method of claim 1, further comprising at least one of laminating or printing an additional layer over the color picture on the back side of the window.

14. The method of claim 13, wherein the additional layer is at least partly transparent.

15. A card manufactured with the method according to claim 1, and comprising the window having the color picture printed onto the back side thereof and having the lasered front side.

16. A device for manufacturing a card having a transparent window with a front side and a back side, the device comprising:

a printing unit configured to print a color picture onto the back side of the window by at least one of dye sublimation or inkjet printing; and a laser unit configured to laser the front side of the window to form a lasered image, such that the color picture and the lasered image form a composite secure color picture;

wherein the laser unit is configured to laser the front side of the window after the print unit prints a color picture onto the back side of the window.

17. The device of claim 16, wherein the laser unit is configured to laser the front side of the window under two different angles.

18. The device of claim 16, wherein the printing unit is configured to print an additional picture onto the back side of the window displaced from the color picture.

19. The device of claim 16, further comprising a laminating unit configured to at least one of laminate or print an additional layer over the color picture on the back side of the window.

20. A device for manufacturing a card having a transparent window with a front side and a back side, the device comprising:

a printing unit configured to print a color picture onto the back side of the window by at least one of dye sublimation or inkjet printing; and a laser unit configured to laser the front side of the window to form a lasered image, such that the color picture and the lasered image form a composite secure color picture;

wherein the laser unit is configured to laser the front side of the window while the print unit prints a color picture onto the back side of the window.

21. A device for manufacturing a card having a transparent window with a front side and a back side, the device comprising:

a printing unit configured to print a color picture onto the back side of the window by at least one of dye sublimation or inkjet printing; and a laser unit configured to laser the front side of the window to form a lasered image, such that the color picture and the lasered image form a composite secure color picture;

wherein the laser unit is configured to laser the front side of the window before the print unit prints a color picture onto the back side of the window.

* * * * *